US012244062B2

(12) United States Patent
Shirazi et al.

(10) Patent No.: US 12,244,062 B2
(45) Date of Patent: Mar. 4, 2025

(54) ANTENNA GAIN ENHANCEMENT USING FREQUENCY SELECTIVE SURFACE

(71) Applicant: QUALCOMM Incorporated, San Diego, CA (US)

(72) Inventors: Mahmoud Shirazi, San Diego, CA (US); Guining Shi, San Diego, CA (US); Allen Minh-Triet Tran, Rancho Santa Fe, CA (US); Derek Punch, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 17/952,071

(22) Filed: Sep. 23, 2022

(65) Prior Publication Data

US 2024/0106130 A1 Mar. 28, 2024

(51) Int. Cl.
*H01Q 15/00* (2006.01)
*H01Q 1/38* (2006.01)
*H01Q 5/392* (2015.01)

(52) U.S. Cl.
CPC .......... *H01Q 15/0013* (2013.01); *H01Q 1/38* (2013.01)

(58) Field of Classification Search
CPC .... H01Q 1/243; H01Q 15/0013; H01Q 5/392; H01Q 1/38; H01Q 9/045; H01Q 21/08; H01Q 21/24
See application file for complete search history.

(56) References Cited

U.S. PATENT DOCUMENTS 11,114,742 B2 * 9/2021 Shrivastava ............ G02F 1/163
2019/0044244 A1 * 2/2019 Kristou .............. H01Q 15/0066

* cited by examiner

*Primary Examiner* — Wei Y Chan
(74) *Attorney, Agent, or Firm* — SUNSTEIN LLP/Qualcomm Incorporated

(57) ABSTRACT

A method of using an antenna system, comprising a transducer that is configured to transduce between wireless signals and wired signals and that is disposed between a ground conductor and a frequency selective surface, includes: providing constructive interference between a first signal of a first frequency and a reflected first signal comprising a reflection of a portion of the first signal by the frequency selective surface and the ground conductor; and providing constructive interference between a second signal of a second frequency, different from the first frequency, and a reflected second signal comprising a reflection of a portion of the second signal by the frequency selective surface and the ground conductor.

29 Claims, 10 Drawing Sheets

ANTENNA GAIN ENHANCEMENT USING FREQUENCY SELECTIVE SURFACE

BACKGROUND

Wireless communication devices are increasingly popular and increasingly complex. For example, mobile telecommunication devices have progressed from simple phones, to smart phones with multiple communication capabilities (e.g., multiple cellular communication protocols, Wi-Fi, BLUETOOTH® and other short-range communication protocols), supercomputing processors, cameras, etc. Wireless communication devices have antennas to support various functionality such as communication over a range of frequencies, reception of Global Navigation Satellite System (GNSS) signals, also called Satellite Positioning Signals (SPS signals), etc.

With several antennas desired to be disposed in a single wireless communication device, one or more antennas may operate in the presence of one or more obstructions. For example, an antenna may have boresight aimed through a display of a device or other large obstruction.

SUMMARY

An example an antenna system includes: a transducer comprising one or more antenna elements; and a gain enhancement structure comprising a frequency selective surface and a ground conductor; wherein the transducer is disposed between the ground conductor and the frequency selective surface; and wherein the gain enhancement structure is configured to: provide constructive interference between a first signal of a first frequency and a reflected first signal comprising a reflection of a portion of the first signal by the frequency selective surface and the ground conductor; and provide constructive interference between a second signal of a second frequency, different from the first frequency, and a reflected second signal comprising a reflection of a portion of the second signal by the frequency selective surface and the ground conductor.

An example method of using an antenna system, comprising a transducer that is configured to transduce between wireless signals and wired signals and that is disposed between a ground conductor and a frequency selective surface, includes: providing constructive interference between a first signal of a first frequency and a reflected first signal comprising a reflection of a portion of the first signal by the frequency selective surface and the ground conductor; and providing constructive interference between a second signal of a second frequency, different from the first frequency, and a reflected second signal comprising a reflection of a portion of the second signal by the frequency selective surface and the ground conductor.

Another example antenna system includes: means for transducing between wireless signals and wired signals; and means for enhancing gain provided by the means for transducing, the means for enhancing gain comprising a frequency selective surface and a ground conductor; wherein the means for transducing are disposed between the ground conductor and the frequency selective surface; and wherein the means for enhancing gain comprise: means for providing constructive interference between a first signal of a first frequency and a reflected first signal comprising a reflection of a portion of the first signal by the frequency selective surface and the ground conductor; and means for providing constructive interference between a second signal of a second frequency, different from the first frequency, and a reflected second signal comprising a reflection of a portion of the second signal by the frequency selective surface and the ground conductor.

Another example antenna system includes: a transducer comprising one or more antenna elements; and a gain enhancement structure comprising a frequency selective surface and a ground conductor; wherein the transducer is disposed between the ground conductor and the frequency selective surface; and wherein the frequency selective surface comprises a plurality of unit cells each including: an inner electrically-conductive member having a first meandering perimeter; and an outer electrically-conductive member being an annular conductor and having a second meandering perimeter and having an inner boundary; wherein the inner electrically-conductive member is disposed inside the inner boundary of the outer electrically-conductive member.

DETAILED DESCRIPTION

Techniques are discussed herein for enhancing antenna gain using a frequency selective surface (FSS). For example, an FSS may be placed in front of a transducer of one or more antenna elements, with the FSS being configured to increase gain provided by the antenna element(s). The FSS may be larger than an area occupied by antenna element(s). The transducer may be disposed between the FSS and a ground plane, and an electrical distance between the FSS and the ground plane may be adjusted to tune a frequency range for which the FSS increases the antenna gain and/or at which a peak gain is provided. The electrical distance may, for example, be adjusted by changing a physical separation of the FSS and the ground plane and/or by changing a relative permittivity of a material disposed between the FSS and the ground plane. The FSS may be a dual-band FSS that is configured to have multiple pass bands over which the FSS passes signals with less than a threshold amount of attenuation (e.g., a reflection coefficient below −3 dB, or below −5 dB), and a stop band, between pass bands, over which the FSS significantly inhibits signal passage through the FSS (e.g., with a reflection coefficient above a threshold such as −3 dB or −5 dB). Other configurations, however, may be used.

Items and/or techniques described herein may provide one or more of the following capabilities, as well as other capabilities not mentioned. Gain of a transducer of one or more antenna elements may be increased. A frequency band of increased gain of a transducer may be tuned. Gain of a transducer may be increased in one frequency band without significantly decreasing the gain in another frequency band. A frequency selective surface may provide simultaneous support for multi-band carrier aggregation. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Figure 1:
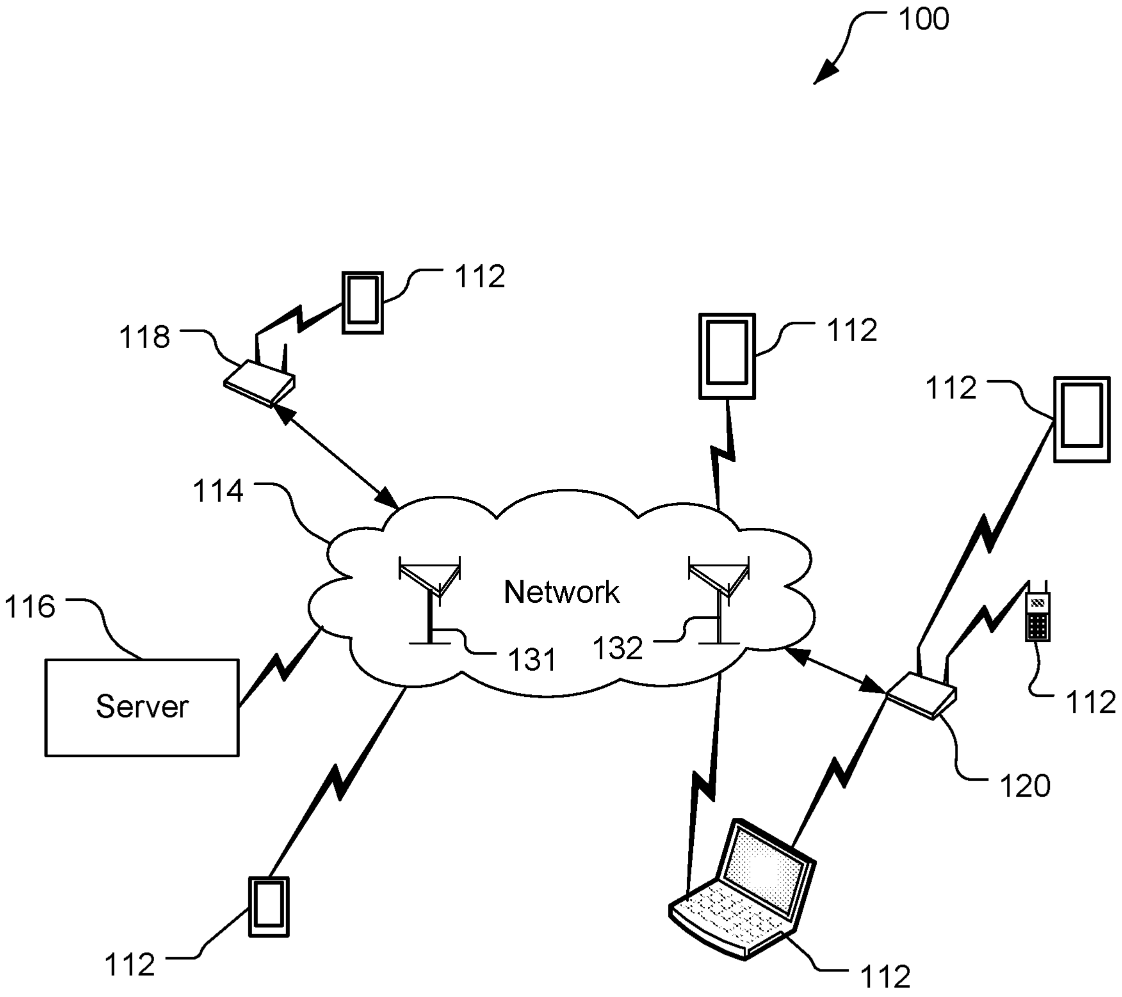
FIG. 1 is a schematic diagram of a communication system.

Referring to FIG. 1, a communication system 100 includes mobile devices 112, a network 114, a server 116, and access points (APs) 118, 120. The communication system 100 is a wireless communication system in that components of the communication system 100 can communicate with one another (at least sometimes) using wireless connections directly or indirectly, e.g., via the network 114 and/or one or more of the access points 118, 120 (and/or one or more other devices not shown, such as one or more base transceiver stations). For indirect communications, the communications may be altered during transmission from one entity to another, e.g., to alter header information of data packets, to change format, etc. The mobile devices 112 shown are mobile wireless communication devices (although they may communicate wirelessly and via wired connections) including mobile phones (including smartphones), a laptop computer, and a tablet computer. Still other mobile devices may be used, whether currently existing or developed in the future. Further, other wireless devices (whether mobile or not) may be implemented within the communication system 100 and may communicate with each other and/or with the mobile devices 112, network 114, server 116, and/or APs 118, 120. For example, such other devices may include internet of thing (IoT) devices, medical devices, home entertainment and/or automation devices, automotive devices, etc. The mobile devices 112 or other devices may be configured to communicate in different networks and/or for different purposes (e.g., 5G, Wi-Fi communication, multiple frequencies of Wi-Fi communication, satellite communication and/or positioning, one or more types of cellular communications (e.g., GSM (Global System for Mobiles), CDMA (Code Division Multiple Access), LTE (Long-Term Evolution), etc.), Bluetooth® communication, etc.). The network 114 may include one or more base stations, e.g., base stations 131, 132 shown as cell towers.

Figure 2:
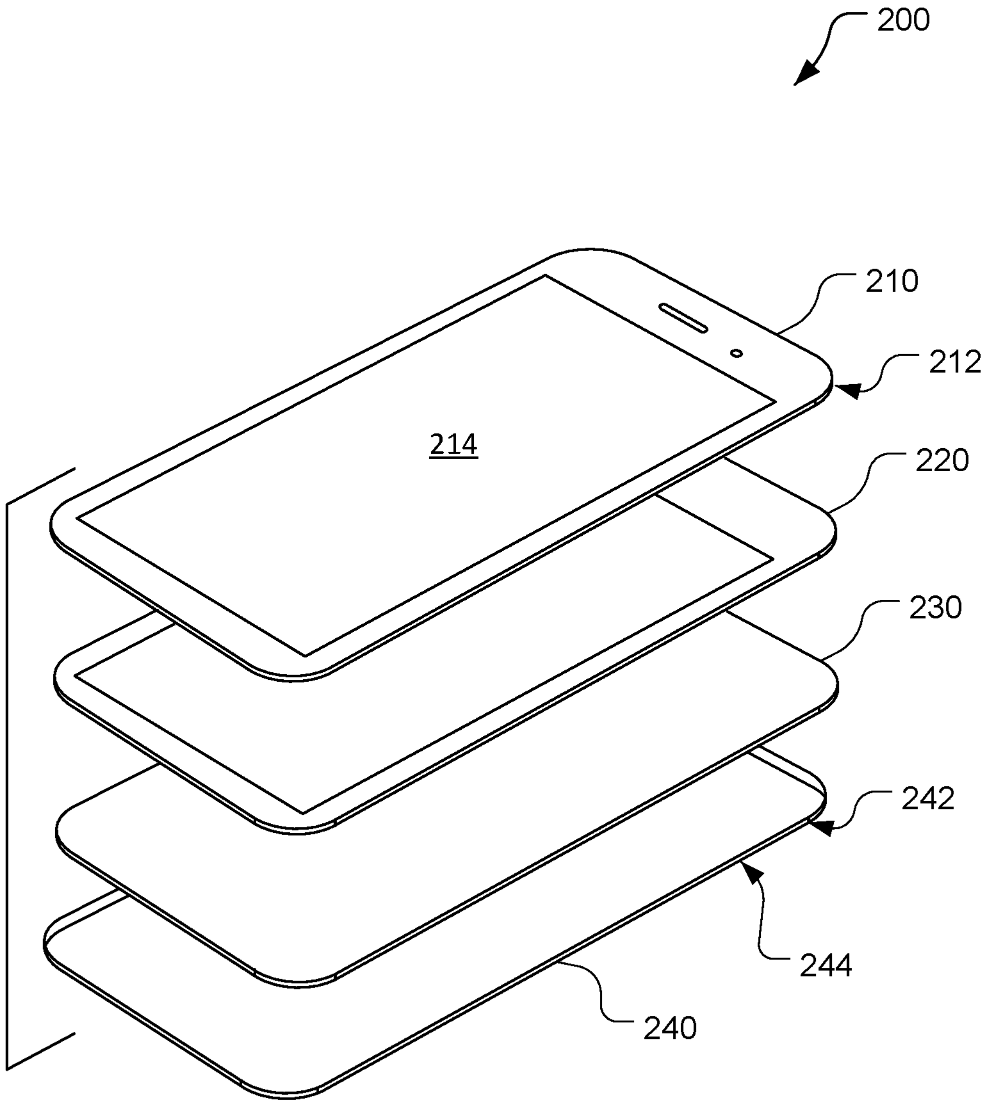
FIG. 2 is an exploded perspective view of simplified components of a mobile device shown in FIG. 1.

Referring to FIG. 2, a wireless communication device 200, which is an example of one of the mobile devices 112 shown in FIG. 1, includes a top cover 210, a display layer 220, a printed circuit board (PCB) layer 230, and a bottom cover 240. The wireless communication device 200 as shown may be a smartphone or a tablet computer but embodiments described herein are not limited to such devices (for example, in other implementations of concepts described herein, a device may be a router or customer premises equipment (CPE)). The top cover 210 includes a screen 214. The bottom cover 240 has a bottom surface 244. Sides 212, 242 of the top cover 210 and the bottom cover 240 provide an edge surface. The top cover 210 and the bottom cover 240 comprise a housing that retains the display layer 220, the PCB layer 230, and other components of the wireless communication device 200 that may or may not be on the PCB layer 230. For example, the housing may retain (e.g., hold, contain) or be integrated with one or more antenna systems, one or more front-end circuits, one or more intermediate-frequency circuits, one or more transceivers, and one or more processors. The housing may be substantially rectangular, having two sets of parallel edges in the illustrated embodiment, and may be configured to bend or fold. In this example, the housing has rounded corners, although the housing may be substantially rectangular with other shapes of corners, e.g., straight-angled (e.g., 45°) corners, 90°, other non-straight corners, etc. Further, the size and/or shape of the PCB layer 230 may not be commensurate with the size and/or shape of either of the top or bottom covers or otherwise with a perimeter of the device. For example, the PCB layer 230 may have a cutout to accept a battery. Further, the PCB layer 230 may include sandwiched boards and/or a PCB daughter board. Daughter boards may be chosen to facilitate a design and/or manufacturing process, e.g., to reinforce a functional separation or to better utilize a space in the housing. Embodiments of the PCB layer 230 other than those illustrated may be implemented.

Figure 3:
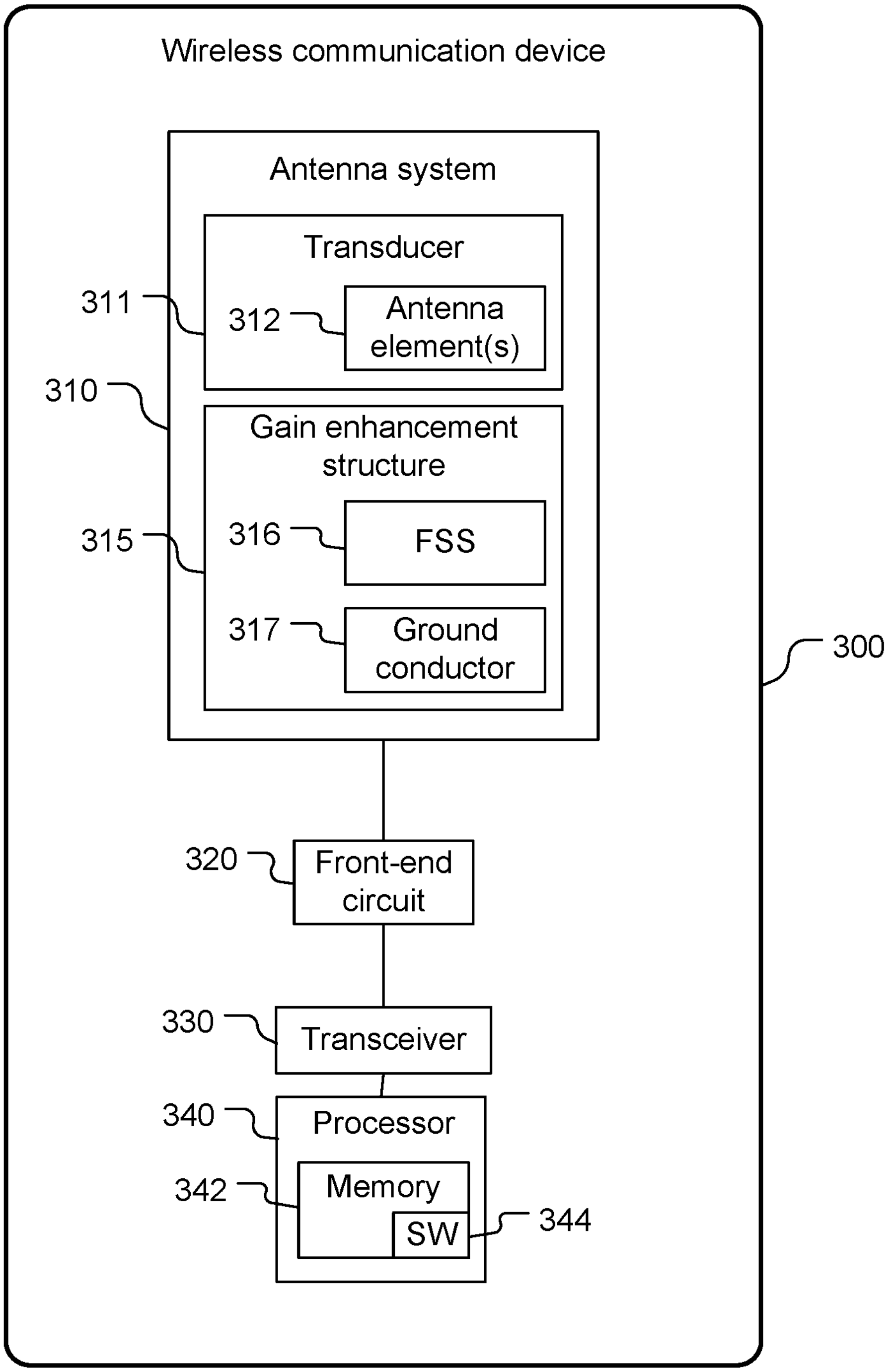
FIG. 3 is a simplified block diagram of a wireless communication device.

Referring also to FIG. 3, a wireless communication device 300, of which the wireless communication device 200 may be an example, includes an antenna system 310, a front-end circuit 320, a transceiver 330, and a processor 340. In the example shown, the device 300 includes a single antenna system, a single front-end circuit, a single transceiver, and a single processor, but other quantities of any of these apparatus may be included in a wireless communication device.

Various implementations of the processor 340 are possible. The processor 340 may be implemented as a modem or a portion thereof. The processor 340 may include one or more intelligent hardware devices, e.g., a central processing unit (CPU), a microcontroller, an application specific integrated circuit (ASIC), etc. The processor 340 may comprise multiple processors including a general-purpose/application processor, a Digital Signal Processor (DSP), a modem processor, a video processor, and/or a sensor processor.

The processor 340 includes memory 342, although the processor 340 may also or alternatively interact with memory external to the processor 340. The memory 342 is a non-transitory storage medium that may include random access memory (RAM), flash memory, disc memory, and/or read-only memory (ROM), etc. The memory 342 stores software 344 which may be processor-readable, processor-executable software code containing instructions that are configured to, when executed, cause the processor 340 to perform various functions described herein. One or more portions of the software 344 may be directly executable by the processor 340 to cause the processor 340 to perform one or more functions, and/or one or more portions of the software 344 may not be directly executable by the processor 340 but may be configured to cause the processor 340, e.g., when compiled and executed, to perform one or more functions. The description may refer to the processor 340 performing a function, but this includes other implementations such as where the processor 340 executes software and/or firmware.

The front-end circuit 320 may be configured to provide signals to be radiated by the antenna system 310 and/or to receive and process signals that are received by, and provided to the front-end circuit 320 from, the antenna system 310. The front-end circuit 320 may be configured to process (e.g., amplify, route, filter, etc.) RF (Radio Frequency) signals received from the transceiver 330 or the antenna system 310, for example without significantly adjusting a frequency thereof. The front-end circuit 320 may be configured in some examples to convert received IF signals from the transceiver 330 to RF signals (amplifying with a power amplifier and/or phase shifting signals, for example when coupled to an antenna array, as appropriate), and provide the RF signals to the antenna system 310 for radiation. Similarly, the front-end circuit 320 may be configured to convert RF signals received by the antenna system 310 to IF signals (e.g., using a low-noise amplifier and a mixer) and to send the IF signals to the transceiver 330.

The transceiver 330 may be configured to convert IF signals received from the front-end circuit 320 to baseband signals and to provide the baseband signals to the processor 340. The transceiver 330 may also or alternatively be configured to convert baseband signals provided by the processor 340 to IF signals, and to provide the IF signals to the front-end circuit 320. The processor 340 is communicatively coupled to the transceiver 330, which is communicatively coupled to the front-end circuit 320, which is communicatively coupled to the antenna system 310.

The antenna system 310 includes a transducer 311 and a gain enhancement structure 315. The transducer 311 includes one or more antenna elements 312 configured to transduce between wired signals and wireless signals. The antenna element(s) 312 may comprise an array of antenna elements that may be configured for beamforming. In some examples, the antenna element(s) 312 are configured for operation with frequencies from 24 GHz to 42 GHz (or one or more portions of this range of frequencies). The transducer 311 may include one or more energy couplers (not shown) that are coupled to the antenna element(s) 312 and that are configured to convey energy to and/or from the antenna element(s) 312.

The gain enhancement structure 315 includes an FSS 316 (frequency selective surface) and a ground conductor 317. The gain enhancement structure 315 may be configured to enhance the gain provided by the transducer 311 such that the gain provided by the antenna system 310 is higher, at least for some frequencies, than the gain provided by the transducer 311 alone. The gain enhancement structure 315 may be tunable, such that the gain enhancement structure 315 may enhance the gain of the transducer 311 (i.e., of the antenna element(s)) over a range of frequencies, with the frequency of a peak gain provided by the antenna element(s) 312 and the gain enhancement structure 315 being selectable. The FSS 316 may be a single-band FSS or a dual-band FSS configured to substantially pass signals of multiple pass bands and to substantially reflect signals of frequencies in one or more stop bands (e.g., between pass bands). For example, the FSS 316 may be configured to reflect less than 50% of energy of signals with frequencies in the pass bands and to reflect more than 50% of energy of signals outside of the pass bands. By enhancing the gain of the antenna system 310, the gain enhancement structure 315 can enable communication that otherwise may not be possible, at least not without increasing transmitter power (and thus costing more, consuming more battery power, and/or possibly creating thermal problems). By using a dual-band FSS, multiple frequency bands may be used for communication simultaneously, e.g., for MIMO (Multiple Input Multiple Output) operation.

Various configurations may be used for the FSS 316. For example, the FSS 316 may comprise a grid of square conductive patches separated by gaps. A square-patch FSS may increase the gain of a dual-polarized antenna array. This type of FSS may increase the gain provided by the antenna element(s) 312 for some frequencies while preserving the gain provided by the antenna element(s) 312 in other frequencies of a frequency band.

Figure 4:
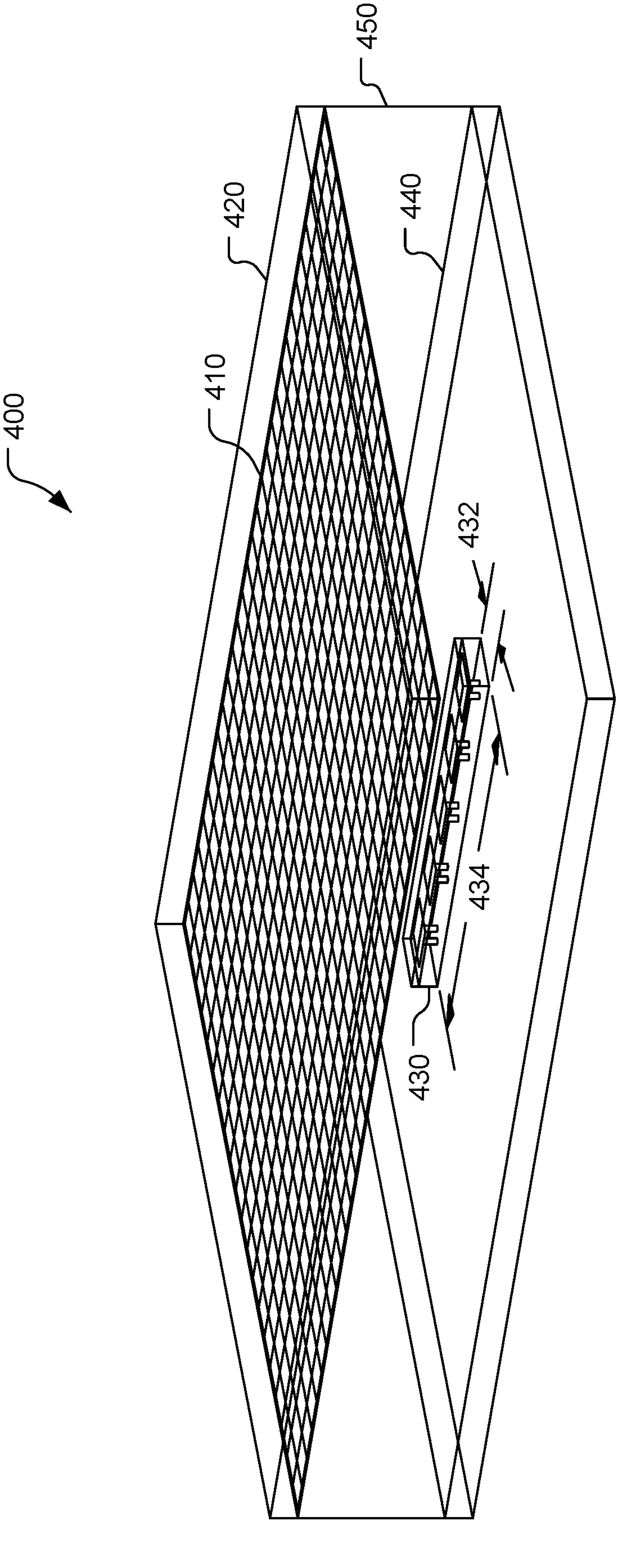
FIG. 4 is a perspective view of an example antenna system.
Figure 5:
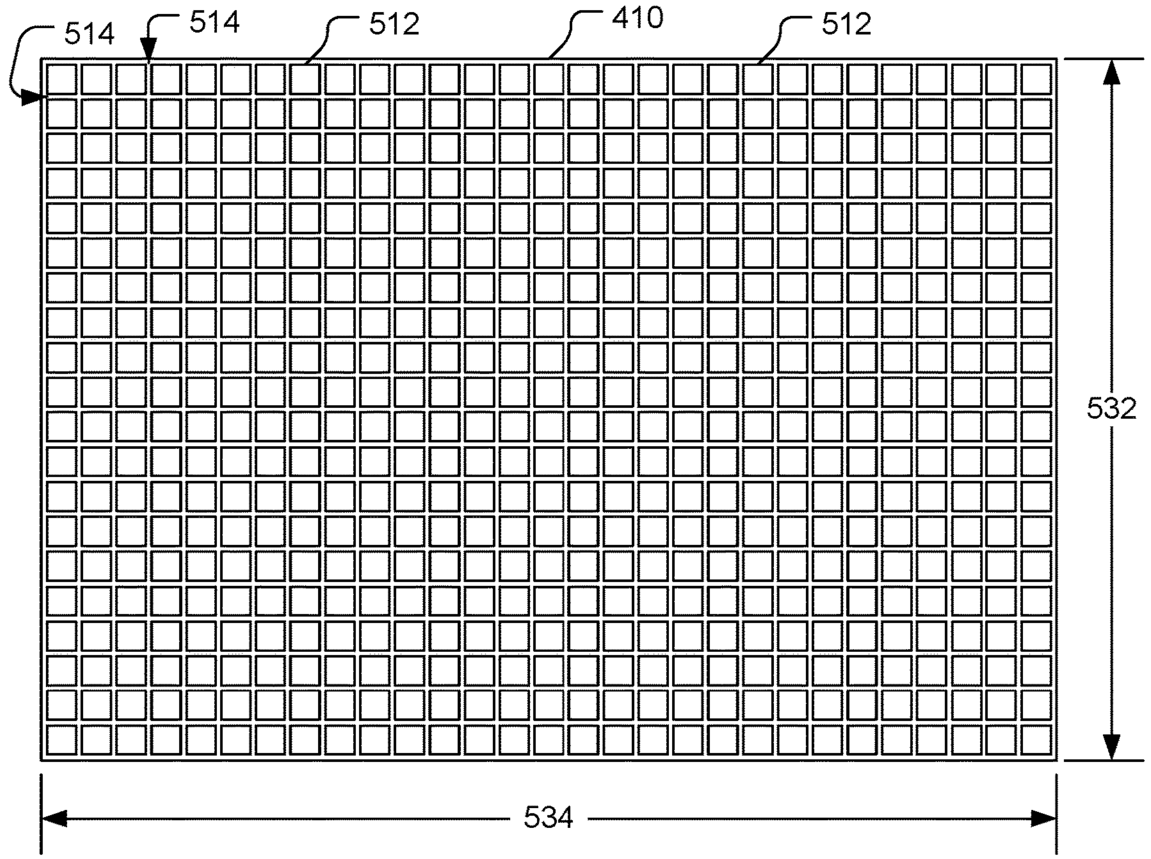
FIG. 5 is a top view of a frequency selective surface of the antenna system shown in FIG. 4.
Figure 6:
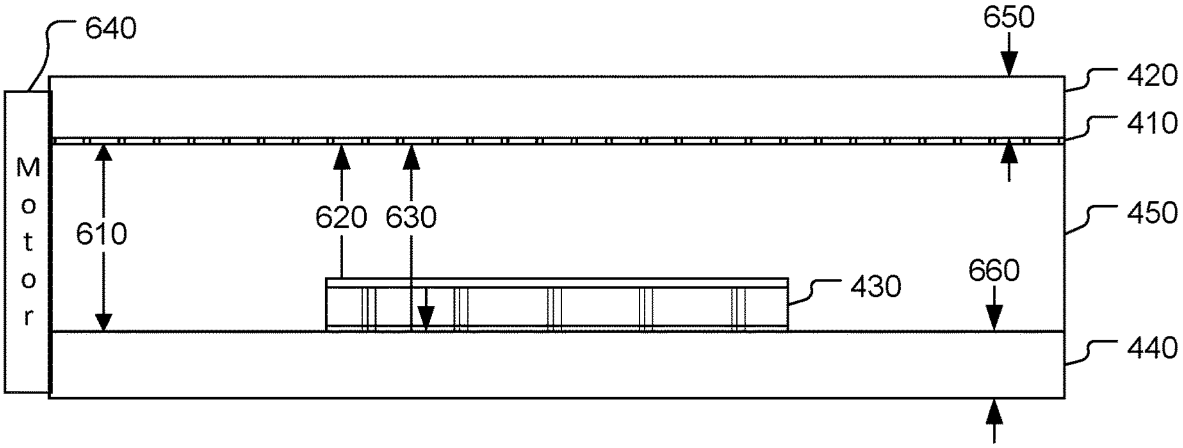
FIG. 6 is a side view of the antenna system shown in FIG. 4, including a motor.

Referring also to FIGS. 4-6, an antenna system 400 includes a square-patch FSS 410, a superstrate 420, a transducer 430, a ground conductor 440 (which may be referred to as a ground plane), and a separator 450. The FSS 410 comprises a two-dimensional grid of square patches 512 separated by respective gaps 514. The patches 512 of the FSS 410 are electrically conductive (e.g., comprising deposited metal) and may be held in place by being connected to the superstrate 420, which may be made of a material (e.g., foam) with a relative permittivity close to that of free space. The superstrate 420 may have a thickness 650 that is adequate to provide structural integrity for the FSS 410 while being sufficiently thin, e.g., about 1 mm, not to significantly affect signals propagated through the superstrate 420. The separator 450 may comprise air, or may comprise a dielectric material (e.g., with a relative permittivity near that of free space) to provide structural integrity to the antenna system 400, or may comprise another material. A thickness 660 of the ground conductor 440 may be about 1 mm although other ground conductor thicknesses may be used. A phase of a reflection coefficient of the FSS 410 may vary with frequency, making the FSS 410 inherently narrowband.

The sizes of the patches 512 and the sizes of the gaps 514 may be selected such that the FSS 410 will substantially pass signals at desired frequencies of a desired frequency band and, in combination with the ground conductor 440, will increase gain of the transducer 430 over at least some of the desired frequency band. For example, the patches 512 may be 2 mm×2 mm square electrically-conductive patches with 0.15 mm gaps between adjacent ones of the patches 512 for operation with signals of frequencies between about 24 GHz and about 42 GHz. A separation distance 610 between the ground conductor 440 and the FSS 410 may be set in order for signals 620 incident upon the FSS 410 from the transducer 430 to be in phase and thus constructively interfere, or be nearly in phase and thus add, with signals 630 from the transducer 430 that are reflected by the ground conductor 440 and then are incident upon the FSS (e.g., within +/−15° of boresight such as within +/−15° of boresight). For example, the distance 610 may be between about 4 mm and about 6.5 mm for operation over frequencies from about 24 GHz to about 42 GHz.

A motor 640 (shown schematically in FIG. 6) may be provided to adjust the distance 610. The motor 640 may be communicatively coupled to the processor 340 and/or another controller. The processor 340 may send one or more signals to the motor 640 to cause the motor 640 to change the distance 610 to tune the antenna system 400 for a desired frequency band of operation. For example, simulated operation indicated that the gain of the antenna system 400 may be higher than the gain of the transducer 430 without the FSS 410 from, e.g., 24 GHz to 42 GHz, with gain increased over a sub-band of this frequency band at any one time and with the sub-band (and corresponding frequency of peak gain within the sub-band) being tunable. For example, with the transducer 430 operating at 28 GHz, the distance 610 may be set to about 5 mm to provide a peak gain at about 32 GHz (and increased gain from about 30 GHz to about 33.5 GHz), to about 5.5 mm to provide peak gain at about 29.5 GHz (and increased gain from about 24 GHz to about 30 GHz), to about 6 mm to provide peak gain at about 27 GHz (and increased gain from under 24 GHz to about 28 GHz), and to about 6.5 mm to provide peak gain at about 25 GHz (and increased gain from under 24 GHz to about 26 GHz), with the peak gain being about 6.5 dB higher than the gain of the transducer 430 alone, and with the transducer 430 comprising a 1×5 array of dual-polarized patch antenna elements. As another example, simulated operation indicated that with the transducer 430 operating at 38.5 GHz, the distance 610 may be set to about 4 mm to provide a peak gain at about 40 GHz (and increased gain from about 37 GHz to about 41 GHz), to about 4.25 mm to provide a peak gain at about 37.5 GHz (and increased gain from about 30 GHz to about 38.5 GHz), to about 4.5 mm to provide a peak gain at about 35.5 GHz (and increased gain from about 29.5 GHz to about 36.5 GHz), and to about 4.75 mm to provide peak gain at about 33.5 GHz (and increased gain from about 29 GHz to about 34.5 GHz). The peak gain was about 6.7 dB higher than the gain of the transducer 430 alone, without the FSS 410, and with the transducer 430 comprising a 1×5 array of dual-polarized patch antenna elements. In the example shown in FIG. 6, the motor 640 is physically connected to the FSS 410, the superstrate 420, the ground conductor 440, and the separator 450, but other configurations may be used, e.g., with the motor 640 physically connected to the FSS 410 and at least one other portion of the antenna system 400 in order to move the FSS 410 relative to the ground conductor 440 (e.g., also moving the superstrate 420 relative to the ground conductor 440).

Use of the FSS 410 has been found in simulations to improve the CDF (cumulative distribution function) of antenna gain. For example, for use of the transducer 430 in a simulated tablet computer with and without the FSS 410, gain with the FSS 410 was lower, but within 1 dB, of gain without the FSS 410 for about 80% of the sphere surrounding the transducer 430. For about 20% of the sphere (at the high end of gain), the gain was higher with the FSS 410, including being over 4 dB higher for a few percent of the sphere.

The FSS 410 may be significantly larger than the transducer 430. For example, the FSS 410 may span an area ten (10) times (or more) larger than an area spanned by the transducer 430 (e.g., the area spanned by the apertures of the antenna elements of the transducer 430). In the example shown in FIGS. 4-6, the transducer 430 comprises a 1×5 array of antenna elements, with a width 432 and a length 434, and the FSS 410 comprises a 20×29 array of the patches 512, with a width 532 and a length 534. The transducer 430 may span an area of about 4.3 mm×about 23.7 mm (about 101.9 $mm^2$) while the FSS 410 spans an area of about 43 mm×about 62.4 mm (about 2,683 $mm^2$), which is about 26 times larger than the area spanned by the transducer 430.

Figure 7:
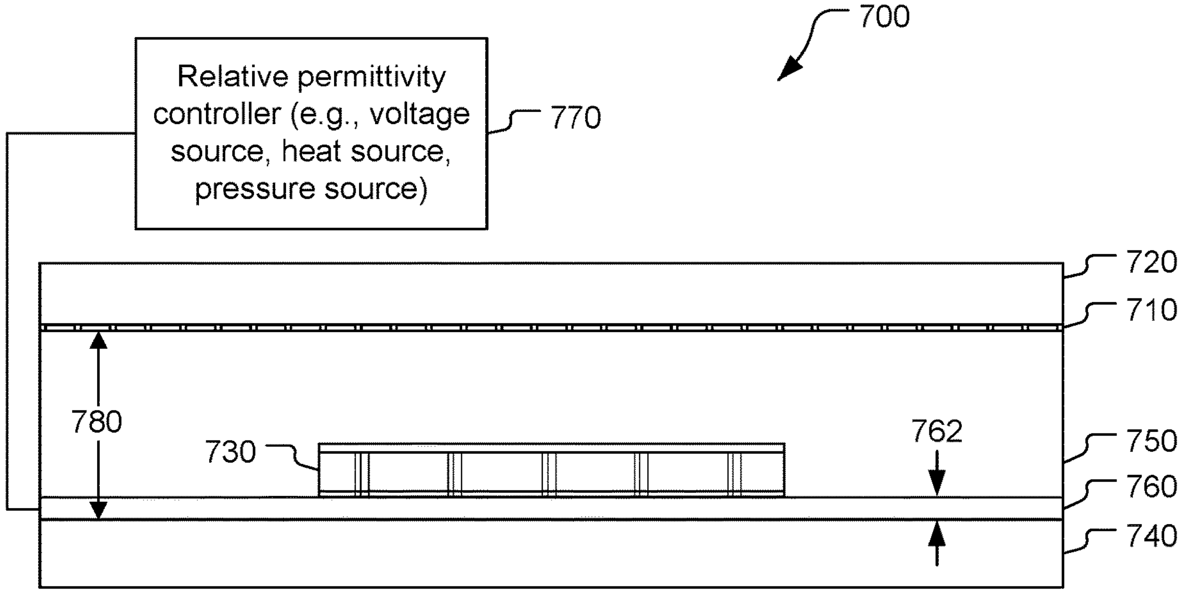
FIG. 7 is a side view of another example antenna system, including a variable-dielectric layer.

Referring also to FIG. 7, an antenna system 700 includes an FSS 710, a superstrate 720, a transducer 730, a ground conductor 740, a separator 750, a variable-dielectric layer 760, and a relative permittivity controller 770. The variable-dielectric layer 760 comprises a dielectric material that may be configured to have the relative permittivity of the variable-dielectric layer 760 change as a function of one or more parameters, e.g., voltage applied to the variable-dielectric layer 760, temperature of the variable-dielectric layer 760, pressure on the variable-dielectric layer 760, and/or one or more other parameters. The relative permittivity controller 770 may be communicatively coupled to a processor (e.g., the processor 340) and configured to respond to one or more instructions from the processor to alter one or more parameters associated with the variable-dielectric layer 760 in order to change the relative permittivity of the variable-dielectric layer 760 as desired (e.g., in accordance with the instruction(s) from the processor). The relative permittivity of the variable-dielectric layer 760 may be changed in order to tune the antenna system 700, e.g., tune a frequency of a peak gain provided by the antenna system 700.

The variable-dielectric layer 760 may be configured as a thin film. For example, the variable-dielectric layer 760 may have a thickness 762 of about ⅕ of a separation distance 780 between the FSS 710 and the ground conductor 740 or less, e.g., about ⅒ of the separation distance 780 or less.

The variable-dielectric layer 760 may comprise any of a variety of materials with variable relative permittivity. For example, the variable-dielectric layer 760 may comprise BSTO (Barium Strontium Titanium Oxide). Various materials with variable relative permittivity may have different ranges of achievable relative permittivity and/or different ratios of highest achievable relative permittivity to lowest achievable relative permittivity. In simulated results, a frequency of peak gain of an antenna system was changed from about 29 GHz to about 39 GHz by changing the relative permittivity of the variable-dielectric layer 760 from 13 to 1.

Figure 8:
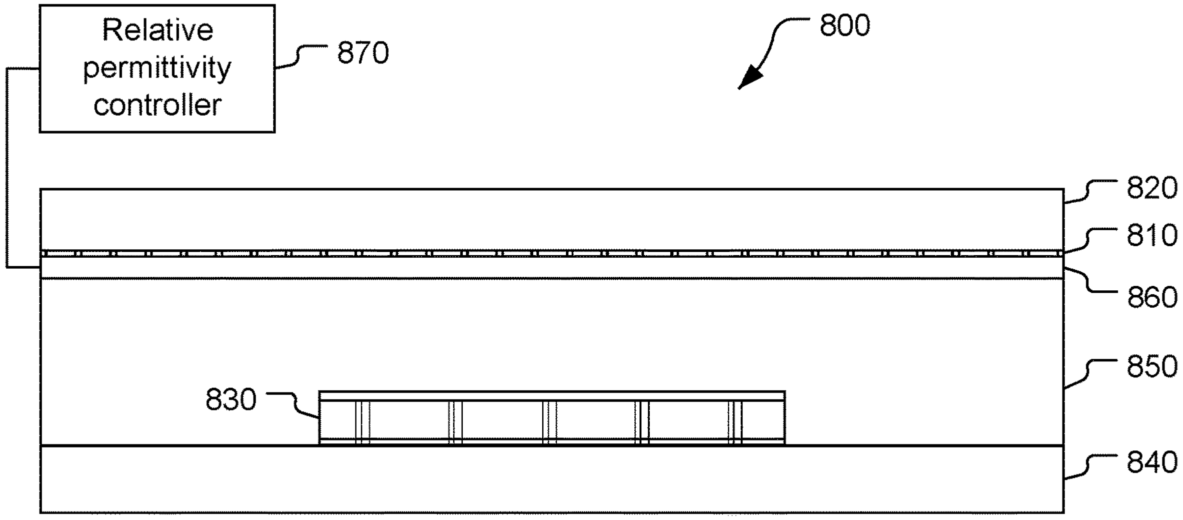
FIG. 8 is a side view of another example antenna system, including a variable-dielectric layer disposed in a different location than in the antenna system shown in FIG. 7.

While the variable-dielectric layer 760 may be, as in the example shown, disposed between the ground conductor 740 and the transducer 730 and the separator 750, a variable-dielectric material may also or alternatively be disposed elsewhere in an antenna system. For example, referring to FIG. 8, an antenna system 800 includes an FSS 810, a superstrate 820, a transducer 830, a ground conductor 840, a separator 850, a variable-dielectric layer 860, and a relative permittivity controller 870. In this example, the variable-dielectric layer 860 is disposed between the FSS 810 and the ground conductor 840 and in contact with the FSS 810.

Wide operational bandwidths of an antenna system may be achieved by adjusting electrical separation of an FSS and a ground conductor, with a transducer disposed between the FSS and the ground conductor. For example, using the mechanical tuning of separation of FSS and ground conductor (e.g., as discussed with respect to FIGS. 4-6), and/or using a changing dielectric to adjust the electrical separation of FSS and ground conductor (e.g., as discussed with respect to FIGS. 7 and 8), extremely wide bandwidths (e.g., from 24 GHz to 42 GHz) may be achieved.

Various configurations of the FSS 316 may be used. For example, referring to FIGS. 9 and 10, a dual-band FSS patch 900 may be configured to substantially pass (e.g., with less than 5 dB attenuation) signals of frequencies within multiple frequency bands. An FSS 1000, a portion of which is shown in FIG. 10, includes an array of the patches 900 with adjacent ones of the patches 900 sharing a common portion of a border (discussed below). The FSS 1000 may substantially pass signals of frequencies of multiple frequency bands, with adjacent one of the multiple frequency bands separated by another frequency band over which the FSS 1000 may be configured to substantially reflect signals (e.g., reflect more than 50% (or another percentage, e.g., more than 70%) of the energy of the signals of the other frequency band). The patches 900 may be symmetrical, e.g., to help avoid asymmetric interaction with different polarizations of signals incident upon the FSS 1000.

The dual-band FSS patch 900 includes an inner member 910, an outer member 920, and a border 930. The inner member 910 and the outer member 920 are configured to pass (e.g., through an array of the patches 900 such as the FSS 1000) signals of different frequency bands, with the inner member 910 being configured to pass a higher-frequency band and the outer member 920 configured to pass a lower-frequency band. The inner member 910, the outer member 920, and the border 930 are electrically-conductive, e.g., comprising deposited metal. Each of the inner member 910 and the outer member 920 have angular symmetry about major axes of the members 910, 920 or diagonals of the members 910, 920. Thus, each of the members 910, 920 being symmetrical about a centerline 950, or a line orthogonal to the centerline 950, or lines +/−45° with respect to the centerline 950.

The inner member 910 may be approximately square and may, as shown in this example, have a solid interior region 911 and have a meandering perimeter 912. For example, a width 916 of the inner member 910 may be about 1.4 mm in order to pass a frequency band around 36 GHz-38 GHz. Other shapes of inner members may be used, e.g., an annular inner member. The meandering perimeter 912 may define multiple slots 913 extending inwardly from respective outer edges 914 of the inner member 910. In this example, the slots 913 are uniformly sized and have rectangular shapes, but these are not requirements. With the slots 913 configured as uniformly-shaped rectangles, the slots 913 may have widths 915 that are less than about $0.01\lambda_0$, where $\lambda_0$ is the free-space wavelength at a center frequency of the frequency band that the inner member 910 is configured to pass. The inner member 910 shown is approximately square, but has edges that are not straight, with corners extending away from central portions of the outer edges 914.

The outer member 920 may be an annular conductor with substantially straight interior edges 921 (deviating from straight by less than about $0.02\lambda_0$ from straight) providing an inner boundary of the outer member 920 and a meandering outer perimeter 922, although other configurations (e.g., shapes) of outer members may be used. For example, a width 923 of the outer member 920 may be about 0.25 mm in order to pass a frequency band around 21 GHz-24 GHz. The meandering outer perimeter 922 may define multiple slots 924 extending inwardly from respective outer edges 925 of the outer member 920. In this example, the slots 924 are uniformly sized and have rectangular shapes, but these are not requirements. With the slots 924 configured as uniformly-shaped rectangles, the slots 924 have widths 926 that are less than about $0.01\lambda_0$, where $\lambda_0$ is the free-space wavelength at a center frequency of the frequency band that the outer member 920 is configured to pass. The patch 900 may be square, measuring about 2.25 mm×2.25 mm for operation from about 17 GHz to about 42 GHz (or higher).

Figure 11:
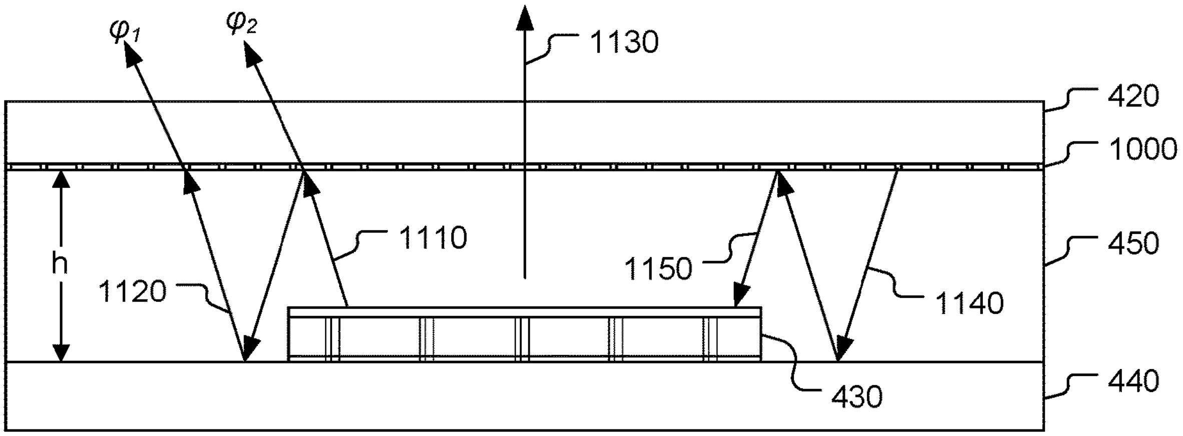
FIG. 11 is a side view of an antenna system using the frequency selective surface shown in FIG. 10.

Referring also to FIG. 11, the FSS 1000 may be designed such that required reflection phases ($\varphi_R$) at respective low and high frequencies are satisfied to provide for dual-band operation. For example, $$\Delta\varphi = \varphi_2 - \varphi_1 = \varphi_R + \pi - \frac{2\pi}{\lambda}2h = -2N\pi \quad N = 0, 1, 2 \ldots \tag{1}$$

where $\varphi_R$ is the reflected phase caused by the FSS 1000, h is the distance between the FSS 1000 and the ground conductor 440. Equation (1) may be solved for $\varphi_R$ according to $$\varphi_R = \frac{4\pi}{\lambda}h - (2N+1)\pi \tag{2}$$

The FSS 1000 may, for example, be designed for n257 (28 GHz) as the low band and n260 (38.5 GHz) as the high band. The distance h for the low and high bands may be given by:

$$h_l = \left(\frac{\varphi_{Rl}}{\pi} + 1\right)\frac{\lambda_l}{4} + N\frac{\lambda_l}{2} \tag{3}$$

$$h_h = \left(\frac{\varphi_{Rh}}{\pi} + 1\right)\frac{\lambda_h}{4} + M\frac{\lambda_h}{2} \tag{4}$$

Where $h_l$ is the distance h for the low band and $h_h$ is the distance h for the high band. For practical applications $h_l = h_h$, such that $$\varphi_{Rh} = 1.375\varphi_{Rl} + (2.75N - 2M + 0.375)\pi \tag{5}$$

For N=1 and M=2, Equation (5) becomes $$\varphi_{Rh} = 1.375\varphi_{Rl} - 0.8757\pi \tag{6}$$

The FSS 1000 may be designed for dual-band operation at the n257 and n260 bands by designing the FSS 1000 to satisfy Equation (6). The FSS 1000, the transducer 430, and the ground conductor 440 may be configured and disposed such that a signal 1110 of any desired frequencies (within desired frequency bands such as pass bands of the FSS 1000) and a reflected signal 1120 (which is a portion of the signal 1110 that is reflected by the FSS 1000 and the ground conductor 440) may additively interfere, e.g., within a desired scan angle (e.g., 45°) of boresight 1130 of the transducer 430. For example, the signals 1110, 1120 (and/or a portion of the signal 1110 that is passed by the FSS 1000 and a portion of the signal 1120 that is passed by the FSS 1000) may constructively interfere if in phase (i.e., 0° phase difference) or interfere in a net positive way, with the combination of the signal 1110 and the reflected signal 1120 being (e.g., on average) stronger than the signal 1110 alone (or the portions of the signals 1110, 1120 passed by the FSS 1000 being stronger than only the portion of the signal 1110 passed by the FSS 1000). The FSS 1000, the transducer 430, and the ground conductor 440 may be configured and disposed to provide less than constructive interference of signals in a frequency band between desired frequency bands, e.g., possibly destructively interfering (being 180° out of phase), within such frequency band (e.g., corresponding to a stop band of the FSS 1000). The interference may be a net negative, with the combination of the signal 1110 and the reflected signal 1120 (and/or a portion of the signal 1110 that is passed by the FSS 1000 and a portion of the signal 1120 that is passed by the FSS 1000) being (e.g., on average) weaker than the signal 1110 alone (or the portions of the signals 1110, 1120 passed by the FSS 1000 being weaker than only the portion of the signal 1110 passed by the FSS 1000), even being zero for destructive interference. Also or alternatively, a signal 1140 may be passed through the FSS, with the signal 1140 having a frequency in a pass band of the FSS 1000, reflected by the ground plane 440 and the FSS 1000 (e.g., a portion of the signal 1140 reflected by the FSS 1000) to produce a reflected signal 1150 that is received by the transducer 430.

Simulated results showed interference at about 28 GHz and about 38.5 GHz. Using the patch 900 with the dimensions discussed above, and with a separation between the FSS 1000 and a ground conductor of 4.5 mm, simulation showed constructive reflected waves due to transmission by a transducer disposed between the FSS 1000 and a ground conductor, and disposed in contact with the ground conductor, at about 28 GHz and about 38.5 GHz. Further, the simulations showed about a 4 dB increase in gain at about 28 GHz with the FSS 1000 present and with little or no attenuation of gain at about 38.5 GHz by using the FSS 1000.

An antenna system with a multi-band (e.g., dual-band) FSS may be configured to be tunable, e.g., per the discussion above. For example, the FSS 410 may be replaced by the FSS 1000 such that the distance 610 may be adjusted by the motor 640. As another example, the FSS 710 or the FSS 810 may be replaced by the FSS 1000 such that tuning of the electrical separation between the FSS 1000 and the ground conductor may be adjusted (e.g., by the controller 770 or the controller 870) by changing a relative permittivity of a material between the FSSS and the ground conductor. As another example, a physical separation of an FSS and a ground conductor may be adjusted in combination with adjusting a relative permittivity of a material between the FSS and the ground conductor.

Experimental Results

Figure 9:
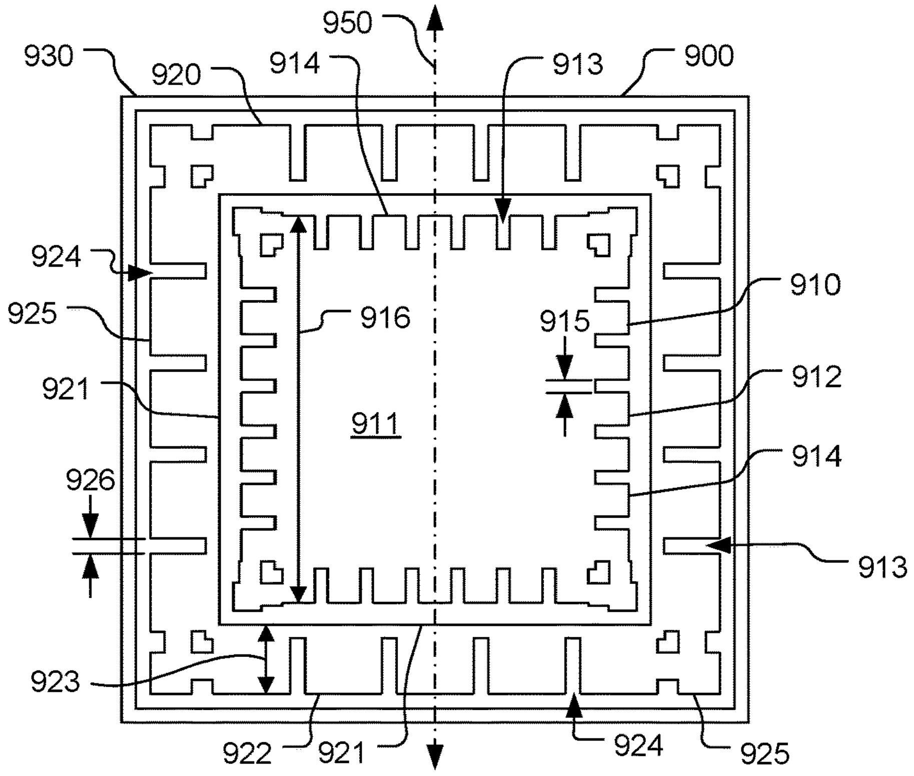
FIG. 9 is a top view of a dual-band frequency selective surface patch.
Figure 10:
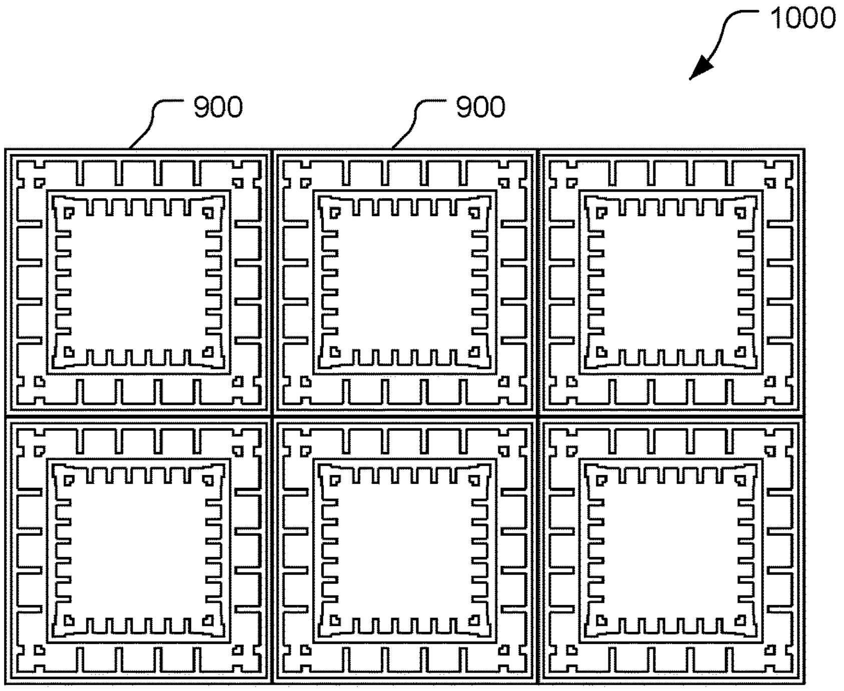
FIG. 10 is a top view of a portion of a frequency selective surface comprising an array of dual-band frequency selective surface patches.
Figure 12:
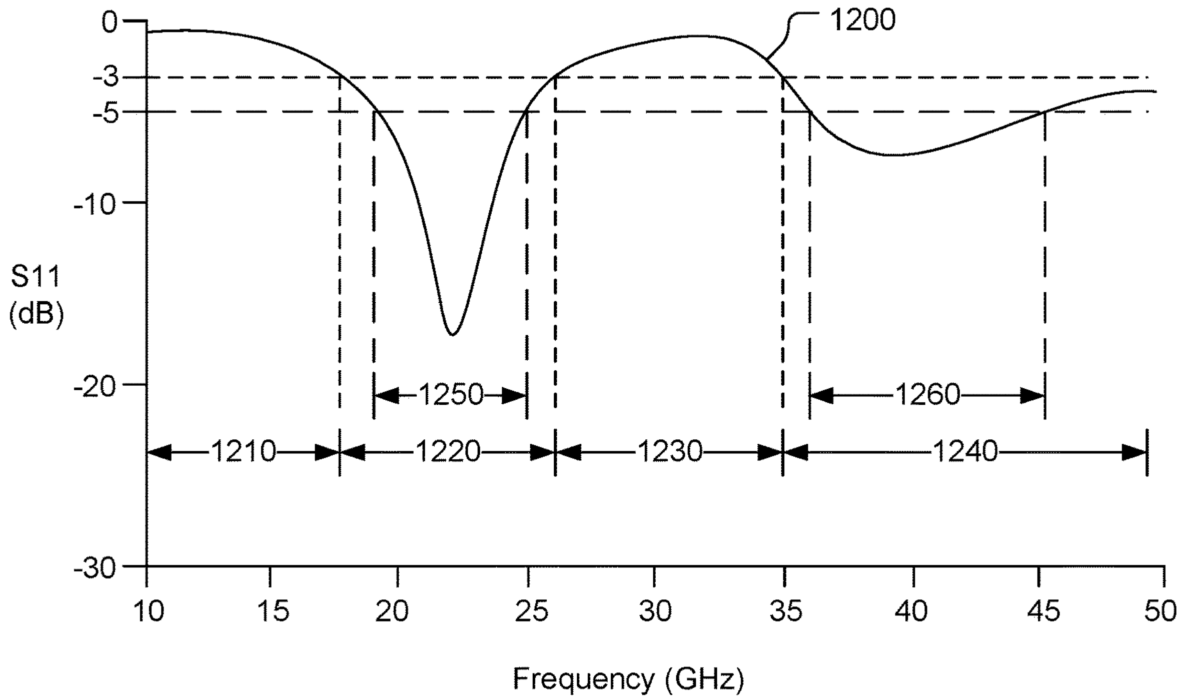
FIG. 12 is a plot of simulated reflection coefficient for the dual-band frequency selective surface patch shown in FIG. 9.

Referring to FIG. 12, with further reference to FIG. 9, a simulation was run for the dual-band FSS patch 900 with a simulated port on either side of the patch 900. A plot 1200 shows the reflection coefficient (S11) for one of the simulated ports, indicating the amount of energy reflected back by the patch 900 to the transmitting port. The plot 1200 is for energy that is incident normal to a surface of the patch 900 (e.g., parallel to boresight of the transducer 430 shown in FIG. 4). As shown, the patch 900 reflected more than 50% (S11 between 0 dB and −3 dB) of the energy incident upon the patch 900 over a stop band 1210 and over a stop band 1230. Also as shown, the patch 900 reflected less than 50% (S11 lower than −3 dB) of the energy incident upon the patch 900 over a pass band 1220 and over a pass band 1240 (i.e., a range of frequencies corresponding to reflection coefficient below a threshold reflection coefficient, in this example, below −3 dB). The pass bands 1220, 1240 (where less than 50% of incident energy is reflected, and more than 50% of the incident energy is allowed to pass through) are separated by the stop band 1230 (a range of frequencies over which more than a threshold amount of incident energy, e.g., more than 50% of incident energy, is reflected and thus the reflection coefficient is above a threshold, e.g., −3 dB in this example although other thresholds may be used, e.g., −5 dB). Based on this simulation, the patch 900 and the FSS 1000 may be useful for the dual bands of the pass band 1220 and the pass band 1240, or one or more other bands. For example, the patch 900 and the FSS 1000 may be used over one or more frequency bands with a lower threshold reflection coefficient threshold such as pass bands 1250, 1260 with a reflection coefficient threshold of −5 dB, such that the patch 900 not only reflects less than about 50% of incident energy, but reflects less than about 32% of the incident energy.

Figure 13:
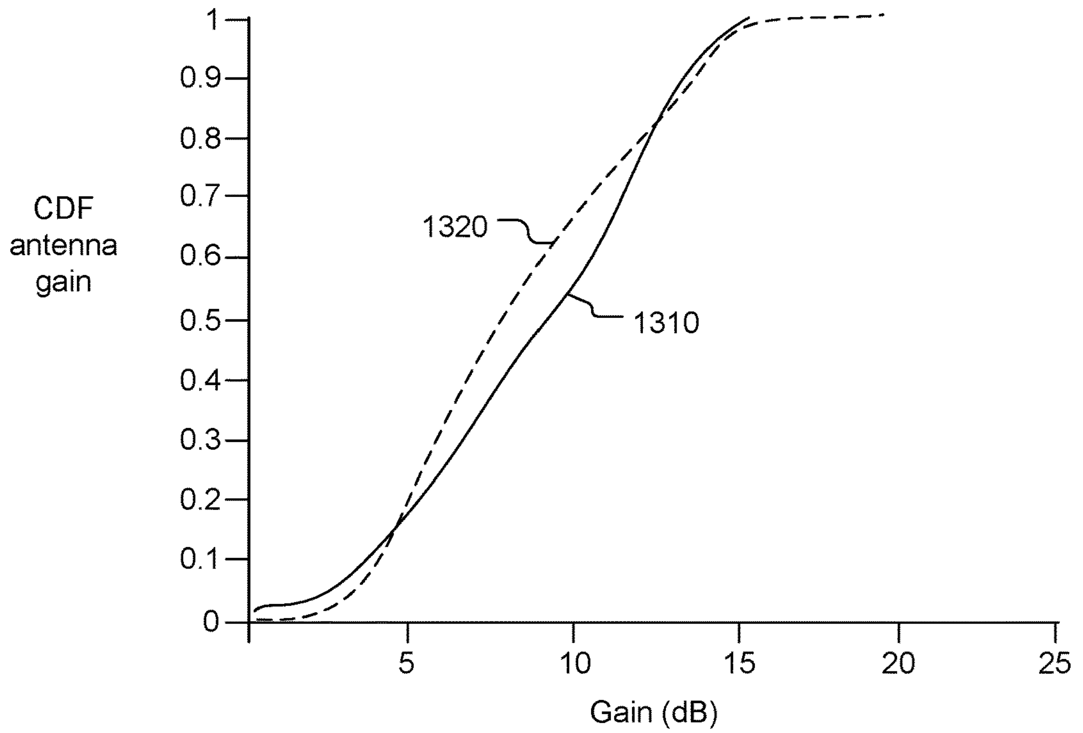
FIG. 13 is a graph of simulated cumulative distribution functions for the antenna system shown in FIG. 4 and for an antenna system similar to the antenna system shown in FIG. 4 but without a frequency selective surface.

Referring to FIG. 13, with further reference to FIGS. 4-6, simulations were run for the antenna system 400 (including the FSS 410) and for the transducer 430 and the ground conductor 440 but without the FSS 410 to determine CDF for each configuration. A plot 1310 shows the CDF without the FSS 410 and a plot 1320 shows the CDF with the FSS 410. As shown, the CDF with the FSS 410 is slightly below, but within about 1 dB of, the CDF without the FSS 410 for about 80% of the sphere, and higher than the CDF without the FSS 410 for about 20% of the sphere. The CDF with the FSS 410 is significantly higher than without the FSS 410 for a few percent of the sphere at the high end of the available gain.

Operation

Figure 14:
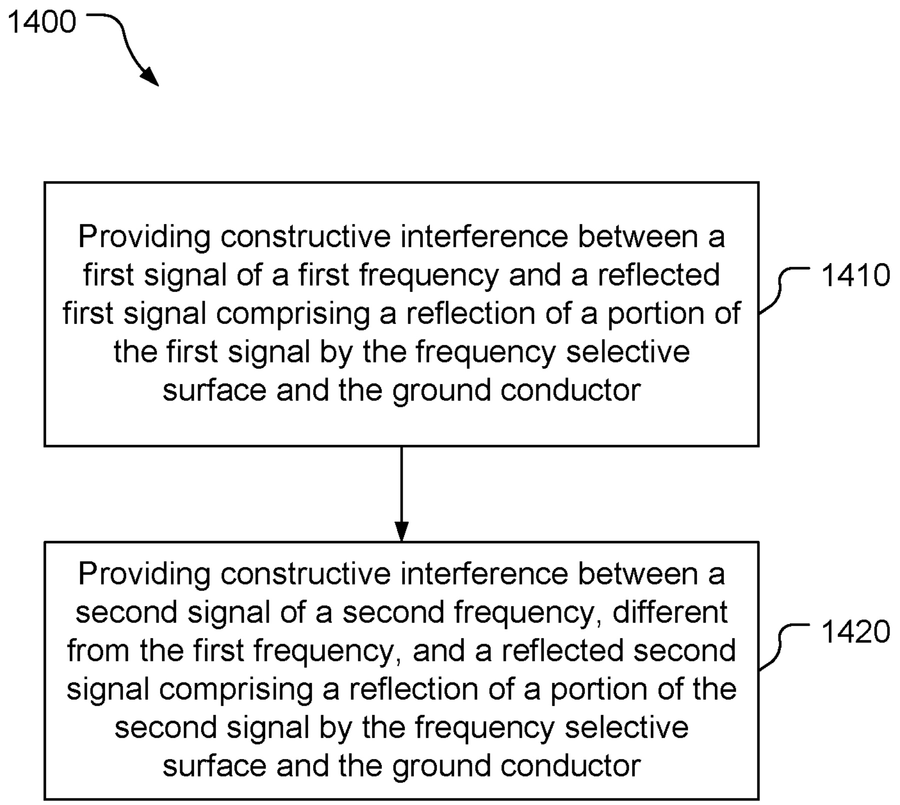
FIG. 14 is a block flow diagram of an example method of using an antenna system.

Referring to FIG. 14, with further reference to FIGS. 1-13, a method 1400 of using an antenna system, that comprises a transducer that is configured to transduce between wireless signals and wired signals and that is disposed between a ground conductor and a frequency selective surface, includes the stages shown. The method 1400 is, however, an example and not limiting. The method 1400 may be altered, e.g., by having one or more stages added, removed, rearranged, combined, performed concurrently, and/or having single stages split into multiple stages.

At stage 1410, the method 1400 includes providing constructive interference between a first signal of a first frequency and a reflected first signal comprising a reflection of a portion of the first signal by the frequency selective surface and the ground conductor. For example, the FSS 1000 and the ground conductor 440 may reflect a portion of the signal 1110, with the signal 1110 being of a first frequency in a first pass band of the FSS 1000, to become the reflected signal 1120 such that the reflected signal 1120 may constructively interfere with the signal 1110 (a later portion of the signal 1110 than produced the signal 1120). While the FSS 1000 may pass most of the signal 1110 if the signal 1110 is within a pass band of the FSS 1000, some energy may be reflected to become the reflected signal 1120 and add to the signal 1110, e.g., for improved gain. The FSS 1000 and the ground conductor 440, possibly in combination with the separator 450, may comprise means for providing constructive interference between the first signal and the reflected first signal.

At stage 1420, the method 1400 includes providing constructive interference between a second signal of a second frequency and a reflected second signal comprising a reflection of a portion of the second signal by the frequency selective surface and the ground conductor. For example, the FSS 1000 and the ground conductor 440 may reflect a portion of the signal 1110, with the signal 1110 being of a second frequency in a second pass band (different from the first pass band) of the FSS 1000, to become the reflected signal 1120 such that the reflected signal 1120 may constructively interfere with the signal 1110 (a later portion of the signal 1110 than produced the signal 1120). While the FSS 1000 may pass most of the signal 1110 if the signal 1110 is within the second pass band of the FSS 1000, some energy may be reflected to become the reflected signal 1120 and add to the signal 1110, e.g., for improved gain. The FSS 1000 and the ground conductor 440, possibly in combination with the separator 450, may comprise means for providing constructive interference between the second signal and the reflected second signal.

Implementations of the method 1400 may include one or more of the following features. In an example implementation, the method 1400 includes: providing less than constructive interference between a third signal of a third frequency, between the first frequency and the second frequency, and a reflected third signal comprising a reflection of at least a portion of the third signal by the frequency selective surface and the ground conductor; and at least one of: passing the first signal through the frequency selective surface with less than 3 dB of attenuation; or passing the second signal through the frequency selective surface with less than 3 dB attenuation. For example, the FSS 1000 and the ground conductor 440 may reflect at least a portion of the signal 1110, with the signal 1110 being in a stop band of the FSS 1000, to become the reflected signal 1120 such that the reflected signal 1120 may less than constructively interfere (i.e., not constructively interfere) with the signal 1110 (a later portion of the signal 1110 than produced the signal 1120). A portion of the combined signal may be passed by the FSS 1000. The interference between the signal 1110 and the reflected signal 1120 may be a net negative, with the combination of the signal 1110 and the reflected signal 1120 being (e.g., on average) weaker than the signal 1110 alone, even being zero for destructive interference. While the FSS 1000 may pass most of the signal 1110 if the signal 1110 is within a pass band of the FSS 1000, some energy may be reflected to become the reflected signal 1120 and add to the signal 1110, e.g., for improved gain. For example, the FSS 1000 may allow portions of signals (e.g., more than 50% of incident energy of frequencies in either of multiple pass bands of the FSS 1000) to pass through the FSS 1000. The FSS 1000 and the ground conductor 440, possibly in combination with the separator 450, may comprise means for providing less than constructive interference between the third signal and the reflected third signal. The signals 1110, 1120 are used for the signals of the first frequency, the second frequency, and the third frequency for illustrative purposes, but signals of different frequencies may be completely different signals although the transmission and reflection (ignoring magnitudes thereof) of all of these signals look like the signals 1110, 1120 (or the signals 1140, 1150, to which the method 1400 may apply) shown in FIG. 11.

Implementations of the method 1400 may include one or more of the following features. In an example implementation, the method 1400 includes: transmitting the first signal by a transducer, disposed between the ground conductor and the frequency selective surface, within 45° of boresight of the transducer or receiving the first signal through the frequency selective surface within 45° of boresight of the transducer; and/or transmitting the second signal by the transducer within 45° of boresight of the transducer or receiving the second signal through the frequency selective surface within 45° of boresight of the transducer; and/or transmitting the third signal by the transducer within 45° of boresight of the transducer or receiving the third signal through the frequency selective surface within 45° of boresight of the transducer. For example, the signal 1110 may be transmitted by the transducer 430 within 45° (i.e., +/−45° of) the boresight 1130, and may be within a pass band or a stop band of the FSS 1000. In another example implementation, the method 1400 comprises providing destructive interference between a third signal of a third frequency, between the first frequency and the second frequency, and a reflected third signal comprising a reflection of at least a portion of the third signal by the frequency selective surface and the ground conductor. For example, within a stop band of the FSS 1000, the signal 1110 and the reflected signal 1120 (e.g., at a particular frequency) may be 180° out of phase with respect to each other and thus destructively interfere.

Also or alternatively, implementations of the method 1400 may include one or more of the following features. In an example implementation, the method includes adjusting an electrical separation of the ground conductor and the frequency selective surface to change from providing constructive interference at the first frequency to providing constructive interference at the second frequency. For example, the electrical separation of a ground conductor and an FSS may be adjusted by adjusting a physical separation and/or a relative permittivity of a material between the ground conductor and the FSS. The electrical separation may be adjusted to alter a frequency of peak gain provided by the transducer from the first frequency to the second frequency. The motor 640, the relative permittivity controller 770, and/or the relative permittivity controller 870, possibly in combination with the processor 340, the ground conductor 440, the separator 450, and the FSS 1000 may comprise means for adjusting the electrical separation. In a further example implementation, adjusting the electrical separation of the ground conductor and the frequency selective surface comprises adjusting a physical separation of the ground conductor and the frequency selective surface. For example, a motor such as the motor 640, possibly controlled by the processor 340, may change a physical distance between an FSS and the ground conductor 440. The motor 640, possibly in combination with the processor 340, may comprise means for adjusting a physical separation of the ground conductor and the frequency selective surface. In another further example implementation, adjusting the electrical separation of the ground conductor and the frequency selective surface comprises adjusting a relative permittivity of a variable-dielectric material disposed between the ground conductor and the frequency selective surface. For example, the relative permittivity controller 770 and/or the relative permittivity controller 870, e.g., under control of the processor 340, may adjust a relative permittivity of a dielectric material, e.g., the variable-dielectric layer 760 and/or the variable-dielectric layer 860, between an FSS and a ground conductor. The relative permittivity controller 770 and/or the relative permittivity controller 870, possibly in combination with the processor 340, may comprise means for adjusting a relative permittivity of a variable-dielectric material.

Implementation Examples

Implementation examples are provided in the following numbered clauses.

Clause 1. An antenna system comprising: a transducer comprising one or more antenna elements; and a gain enhancement structure comprising a frequency selective surface and a ground conductor;

wherein the transducer is disposed between the ground conductor and the frequency selective surface; and wherein the gain enhancement structure is configured to:

provide constructive interference between a first signal of a first frequency and a reflected first signal comprising a reflection of a portion of the first signal by the frequency selective surface and the ground conductor; and provide constructive interference between a second signal of a second frequency, different from the first frequency, and a reflected second signal comprising a reflection of a portion of the second signal by the frequency selective surface and the ground conductor.

Clause 2. The antenna system of clause 1, wherein the frequency selective surface is configured to provide a first pass band, a second pass band, and a stop band, the first pass band corresponding to a first frequency band, the second pass band corresponding to a second frequency band, and the stop band corresponding to a third frequency band that is between the first frequency band and the second frequency band, and wherein the frequency selective surface is configured to have a reflection coefficient that is above −3 dB over the first pass band and the second pass band and that is below −3 dB over the stop band.

Clause 3. The antenna system of clause 2, wherein the frequency selective surface comprises a plurality of unit cells each comprising:

an inner electrically-conductive member having a first meandering perimeter; and an outer electrically-conductive member being an annular conductor and having a second meandering perimeter and having an inner boundary;

wherein the inner electrically-conductive member is disposed inside the inner boundary of the outer electrically-conductive member.

Clause 4. The antenna system of clause 3, wherein each of the inner electrically-conductive member and the outer electrically-conductive member has angular symmetry.

Clause 5. The antenna system of clause 3, wherein the first meandering perimeter defines a plurality of first slots each extending inwardly from a respective outer edge of the inner electrically-conductive member, and the second meandering perimeter defines a plurality of second slots each extending inwardly from a respective outer edge of the outer electrically-conductive member.

Clause 6. The antenna system of clause 5, wherein the plurality of first slots have respective first widths less than 0.01 wavelengths of the first frequency in the first frequency band and the plurality of second slots have respective second widths less than 0.01 wavelengths of the second frequency in the second frequency band.

Clause 7. The antenna system of clause 1, wherein the gain enhancement structure is configured to:

provide constructive interference between the first signal and the reflected first signal, with the first signal transmitted by the transducer within 45° of boresight of the transducer or passed through the frequency selective surface within 45° of boresight of the transducer;

provide constructive interference between the second signal and the reflected second signal, with the second signal transmitted by the transducer within 45° of boresight of the transducer or passed through the frequency selective surface within 45° of boresight of the transducer; and provide less than constructive interference between a third signal and a reflected third signal comprising a reflection of at least a portion of the third signal, with the third signal transmitted by the transducer within 45° of boresight of the transducer or passed through the frequency selective surface within 45° of boresight of the transducer.

Clause 8. The antenna system of clause 1, wherein the gain enhancement structure is configured to provide destructive interference between a third signal of a third frequency, between the first frequency and the second frequency, and a reflected third signal comprising a reflection of at least a portion of the third signal.

Clause 9. The antenna system of clause 1, wherein the one or more antenna elements span a first area and the frequency selective surface spans a second area that is at least ten times the first area.

Clause 10. The antenna system of clause 1, wherein the gain enhancement structure is configured to adjust an electrical separation of the ground conductor and the frequency selective surface to change from providing constructive interference at the first frequency to providing constructive interference at the second frequency.

Clause 11. The antenna system of clause 10, wherein the gain enhancement structure is configured to adjust a physical separation of the ground conductor and the frequency selective surface to change from providing constructive interference at the first frequency to providing constructive interference at the second frequency.

Clause 12. The antenna system of clause 10, wherein the gain enhancement structure comprises a variable-dielectric material disposed between the ground conductor and the frequency selective surface and the gain enhancement structure is configured to adjust a relative permittivity of the variable-dielectric material to adjust the electrical separation of the ground conductor and the frequency selective surface.

Clause 13. The antenna system of clause 12, wherein the variable-dielectric material is disposed in contact with the ground conductor.

Clause 14. The antenna system of clause 12, wherein the variable-dielectric material is disposed between the transducer and the ground conductor.

Clause 15. The antenna system of clause 12, wherein the variable-dielectric material has a thickness of less than 20% of a separation between the frequency selective surface and the ground conductor.

Clause 16. The antenna system of clause 1, wherein the one or more antenna elements span a first area and the frequency selective surface spans a second area that is at least ten times the first area.

Clause 17. A method of using an antenna system comprising a transducer that is configured to transduce between wireless signals and wired signals and that is disposed between a ground conductor and a frequency selective surface, the method comprising:

providing constructive interference between a first signal of a first frequency and a reflected first signal comprising a reflection of a portion of the first signal by the frequency selective surface and the ground conductor; and providing constructive interference between a second signal of a second frequency, different from the first frequency, and a reflected second signal comprising a reflection of a portion of the second signal by the frequency selective surface and the ground conductor.

Clause 18. The method of clause 17, further comprising:

providing less than constructive interference between a third signal of a third frequency, between the first frequency and the second frequency, and a reflected third signal comprising a reflection of at least a portion of the third signal by the frequency selective surface and the ground conductor; and at least one of:

passing the first signal through the frequency selective surface with less than 3 dB of attenuation; or passing the second signal through the frequency selective surface with less than 3 dB attenuation.

Clause 19. The method of clause 18, further comprising at least one of:

transmitting the first signal by a transducer, disposed between the ground conductor and the frequency selective surface, within 45° of boresight of the transducer or receiving the first signal through the frequency selective surface within 45° of boresight of the transducer; or transmitting the second signal by the transducer within 45° of boresight of the transducer or receiving the second signal through the frequency selective surface within 45° of boresight of the transducer; or transmitting the third signal by the transducer within 45° of boresight of the transducer or receiving the third signal through the frequency selective surface within 45° of boresight of the transducer.

Clause 20. The method of clause 17, further comprising providing destructive interference between a third signal of a third frequency, between the first frequency and the second frequency, and a reflected third signal comprising a reflection of at least a portion of the third signal by the frequency selective surface and the ground conductor.

Clause 21. The method of clause 17, further comprising adjusting an electrical separation of the ground conductor and the frequency selective surface to change from providing constructive interference at the first frequency to providing constructive interference at the second frequency.

Clause 22. The method of clause 21, wherein adjusting the electrical separation of the ground conductor and the frequency selective surface comprises adjusting a physical separation of the ground conductor and the frequency selective surface.

Clause 23. The method of clause 21, wherein adjusting the electrical separation of the ground conductor and the frequency selective surface comprises adjusting a relative permittivity of a variable-dielectric material disposed between the ground conductor and the frequency selective surface.

Clause 24. An antenna system comprising:

a transducer comprising one or more antenna elements; and a gain enhancement structure comprising a frequency selective surface and a ground conductor;

wherein the transducer is disposed between the ground conductor and the frequency selective surface; and wherein the frequency selective surface comprises a plurality of unit cells each comprising:

an inner electrically-conductive member having a first meandering perimeter; and an outer electrically-conductive member being an annular conductor and having a second meandering perimeter and having an inner boundary;

wherein the inner electrically-conductive member is disposed inside the inner boundary of the outer electrically-conductive member.

Clause 25. The antenna system of clause 24, wherein each of the inner electrically-conductive member and the outer electrically-conductive member has angular symmetry.

Clause 26. The antenna system of claim 24, wherein the inner boundary is defined by substantially straight edges.

Clause 27. The antenna system of claim 26, wherein the inner electrically-conductive member has a solid interior region.

Clause 28. The antenna system of clause 24, wherein the first meandering perimeter defines a plurality of first slots each extending inwardly from a respective outer edge of the inner electrically-conductive member, and the second meandering perimeter defines a plurality of second slots each extending inwardly from a respective outer edge of the outer electrically-conductive member.

Clause 29. The antenna system of claim 28 wherein the frequency selective surface is configured to provide a first pass band, a second pass band, and a stop band, the first pass band corresponding to a first frequency band, the second pass band corresponding to a second frequency band, and the stop band corresponding to a third frequency band that is between the first frequency band and the second frequency band, and wherein the frequency selective surface is configured to have a reflection coefficient that is above −3 dB over the first pass band and the second pass band and that is below −3 dB over the stop band Clause 30. The antenna system of clause 29, wherein the plurality of first slots have respective first widths less than 0.01 wavelengths of a first frequency in the first frequency band and the plurality of second slots have respective second widths less than 0.01 wavelengths of a second frequency in the second frequency band.

Clause 31. An antenna system comprising:

means for transducing between wireless signals and wired signals; and means for enhancing gain provided by the means for transducing, the means for enhancing gain comprising a frequency selective surface and a ground conductor;

wherein the means for transducing are disposed between the ground conductor and the frequency selective surface; and wherein the means for enhancing gain comprise:

means for providing constructive interference between a first signal of a first frequency and a reflected first signal comprising a reflection of a portion of the first signal by the frequency selective surface and the ground conductor; and means for providing constructive interference between a second signal of a second frequency, different from the first frequency, and a reflected second signal comprising a reflection of a portion of the second signal by the frequency selective surface and the ground conductor.

Clause 32. The antenna system of clause 31, wherein the frequency selective surface is configured to provide a first pass band, a second pass band, and a stop band, the first pass band corresponding to a first frequency band, the second pass band corresponding to a second frequency band, and the stop band corresponding to a third frequency band that is between the first frequency band and the second frequency band, and wherein the frequency selective surface is configured to have a reflection coefficient that is above −3 dB over the first pass band and the second pass band and that is below −3 dB over the stop band.

Clause 33. The antenna system of clause 32, wherein the frequency selective surface comprises a plurality of unit cells each comprising:

an inner electrically-conductive member having a first meandering perimeter; and an outer electrically-conductive member being an annular conductor and having a second meandering perimeter and having an inner boundary;

wherein the inner electrically-conductive member is disposed inside the inner boundary of the outer electrically-conductive member.

Clause 34. The antenna system of clause 33, wherein each of the inner electrically-conductive member and the outer electrically-conductive member has angular symmetry.

Clause 35. The antenna system of clause 33, wherein the first meandering perimeter defines a plurality of first slots each extending inwardly from a respective outer edge of the inner electrically-conductive member, and the second meandering perimeter defines a plurality of second slots each extending inwardly from a respective outer edge of the outer electrically-conductive member.

Clause 36. The antenna system of clause 35, wherein the plurality of first slots have respective first widths less than 0.01 wavelengths of the first frequency in the first frequency band and the plurality of second slots have respective second widths less than 0.01 wavelengths of the second frequency in the second frequency band.

Clause 37. The antenna system of clause 31, wherein the means for enhancing gain comprise:

- means for providing constructive interference between the first signal and the reflected first signal, with the first signal transmitted by the means for transducing within 45° of boresight of the means for transducing or passed through the frequency selective surface within 45° of boresight of the means for transducing;
- means for providing constructive interference between the second signal and the reflected second signal, with the second signal transmitted by the means for transducing within 45° of boresight of the means for transducing or passed through the frequency selective surface within 45° of boresight of the means for transducing; and
- means for providing less than constructive interference between a third signal of a third frequency and a reflected third signal comprising a reflection of at least a portion of the third signal, with the third signal transmitted by the means for transducing within 45° of boresight of the means for transducing or passed through the frequency selective surface within 45° of boresight of the means for transducing.

Clause 38. The antenna system of clause 31, wherein the means for enhancing gain comprise means for providing destructive interference between a third signal of a third frequency, between the first frequency and the second frequency, and a reflected third signal comprising a reflection of at least a portion of the third signal.

Clause 39. The antenna system of clause 31, wherein the one or more antenna elements span a first area and the frequency selective surface spans a second area that is at least ten times the first area.

Clause 40. The antenna system of clause 31, wherein the means for enhancing gain comprise means for adjusting an electrical separation of the ground conductor and the frequency selective surface to change from providing constructive interference at the first frequency to providing constructive interference at the second frequency.

Clause 41. The antenna system of clause 40, wherein the means for adjusting the electrical separation of the ground conductor and the frequency selective surface comprise means for adjusting a physical separation of the ground conductor and the frequency selective surface.

Clause 42. The antenna system of clause 40, wherein the means for adjusting the electrical separation of the ground conductor and the frequency selective surface comprise means for adjusting a relative permittivity of a variable-dielectric material disposed between the ground conductor and the frequency selective surface.

Clause 43. The antenna system of clause 42, wherein the variable-dielectric material is disposed in contact with the ground conductor.

Clause 44. The antenna system of clause 42, wherein the variable-dielectric material is disposed between the means for transducing and the ground conductor.

Clause 45. The antenna system of clause 42, wherein the variable-dielectric material has a thickness of less than 20% of a separation between the frequency selective surface and the ground conductor.

OTHER CONSIDERATIONS

Other examples and implementations are within the scope of the disclosure and appended claims. For example, configurations other than those shown may be used. Also, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices (also called wireless communications devices). A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An antenna system comprising:

a transducer comprising one or more antenna elements; and a gain enhancement structure comprising a frequency selective surface and a ground conductor;

wherein the transducer is disposed between the ground conductor and the frequency selective surface; and wherein the gain enhancement structure is configured to:

provide constructive interference between a first signal of a first frequency and a reflected first signal comprising a reflection of a portion of the first signal by the frequency selective surface and the ground conductor; and provide constructive interference between a second signal of a second frequency, different from the first frequency, and a reflected second signal comprising a reflection of a portion of the second signal by the frequency selective surface and the ground conductor.

2. The antenna system of claim 1, wherein the frequency selective surface is configured to provide a first pass band, a second pass band, and a stop band, the first pass band corresponding to a first frequency band, the second pass band corresponding to a second frequency band, and the stop band corresponding to a third frequency band that is between the first frequency band and the second frequency band, and wherein the frequency selective surface is configured to have a reflection coefficient that is above −3 dB over the first pass band and the second pass band and that is below −3 dB over the stop band.

3. The antenna system of claim 2, wherein the frequency selective surface comprises a plurality of unit cells each comprising:

an inner electrically-conductive member having a first meandering perimeter; and an outer electrically-conductive member being an annular conductor and having a second meandering perimeter and having an inner boundary;

wherein the inner electrically-conductive member is disposed inside the inner boundary of the outer electrically-conductive member.

4. The antenna system of claim 3, wherein each of the inner electrically-conductive member and the outer electrically-conductive member has angular symmetry.

5. The antenna system of claim 3, wherein the first meandering perimeter defines a plurality of first slots each extending inwardly from a respective outer edge of the inner electrically-conductive member, and the second meandering perimeter defines a plurality of second slots each extending inwardly from a respective outer edge of the outer electrically-conductive member.

6. The antenna system of claim 5, wherein the plurality of first slots have respective first widths less than 0.01 wavelengths of the first frequency in the first frequency band and the plurality of second slots have respective second widths less than 0.01 wavelengths of the second frequency in the second frequency band.

7. The antenna system of claim 1, wherein the gain enhancement structure is configured to:

provide constructive interference between the first signal and the reflected first signal, with the first signal transmitted by the transducer within 45° of boresight of the transducer or passed through the frequency selective surface within 45° of boresight of the transducer;

provide constructive interference between the second signal and the reflected second signal, with the second signal transmitted by the transducer within 45° of boresight of the transducer or passed through the frequency selective surface within 45° of boresight of the transducer; and provide less than constructive interference between a third signal and a reflected third signal comprising a reflection of at least a portion of the third signal, with the third signal transmitted by the transducer within 45° of boresight of the transducer or passed through the frequency selective surface within 45° of boresight of the transducer.

8. The antenna system of claim 1, wherein the gain enhancement structure is configured to provide destructive interference between a third signal of a third frequency, between the first frequency and the second frequency, and a reflected third signal comprising a reflection of at least a portion of the third signal.

9. The antenna system of claim 1, wherein the one or more antenna elements span a first area and the frequency selective surface spans a second area that is at least ten times the first area.

10. The antenna system of claim 1, wherein the gain enhancement structure is configured to adjust an electrical separation of the ground conductor and the frequency selective surface to change from providing constructive interference at the first frequency to providing constructive interference at the second frequency.

11. The antenna system of claim 10, wherein the gain enhancement structure is configured to adjust a physical separation of the ground conductor and the frequency selective surface to change from providing constructive interference at the first frequency to providing constructive interference at the second frequency.

12. The antenna system of claim 10, wherein the gain enhancement structure comprises a variable-dielectric material disposed between the ground conductor and the frequency selective surface and the gain enhancement structure is configured to adjust a relative permittivity of the variable-dielectric material to adjust the electrical separation of the ground conductor and the frequency selective surface.

13. The antenna system of claim 12, wherein the variable-dielectric material is disposed in contact with the ground conductor.

14. The antenna system of claim 12, wherein the variable-dielectric material is disposed between the transducer and the ground conductor.

15. The antenna system of claim 12, wherein the variable-dielectric material has a thickness of less than 20% of a separation between the frequency selective surface and the ground conductor.

16. A method of using an antenna system comprising a transducer that is configured to transduce between wireless signals and wired signals and that is disposed between a ground conductor and a frequency selective surface, the method comprising:

providing constructive interference between a first signal of a first frequency and a reflected first signal comprising a reflection of a portion of the first signal by the frequency selective surface and the ground conductor; and providing constructive interference between a second signal of a second frequency, different from the first frequency, and a reflected second signal comprising a reflection of a portion of the second signal by the frequency selective surface and the ground conductor.

17. The method of claim 16, further comprising:

providing less than constructive interference between a third signal of a third frequency, between the first frequency and the second frequency, and a reflected third signal comprising a reflection of at least a portion of the third signal by the frequency selective surface and the ground conductor; and at least one of:

passing the first signal through the frequency selective surface with less than 3 dB of attenuation; or passing the second signal through the frequency selective surface with less than 3 dB attenuation.

18. The method of claim 17, further comprising at least one of:

transmitting the first signal by a transducer, disposed between the ground conductor and the frequency selective surface, within 45° of boresight of the transducer or receiving the first signal through the frequency selective surface within 45° of boresight of the transducer; or transmitting the second signal by the transducer within 45° of boresight of the transducer or receiving the second signal through the frequency selective surface within 45° of boresight of the transducer; or transmitting the third signal by the transducer within 45° of boresight of the transducer or receiving the third signal through the frequency selective surface within 45° of boresight of the transducer.

19. The method of claim 16, further comprising providing destructive interference between a third signal of a third frequency, between the first frequency and the second frequency, and a reflected third signal comprising a reflection of at least a portion of the third signal by the frequency selective surface and the ground conductor.

20. The method of claim 16, further comprising adjusting an electrical separation of the ground conductor and the frequency selective surface to change from providing constructive interference at the first frequency to providing constructive interference at the second frequency.

21. The method of claim 20, wherein adjusting the electrical separation of the ground conductor and the frequency selective surface comprises adjusting a physical separation of the ground conductor and the frequency selective surface.

22. The method of claim 20, wherein adjusting the electrical separation of the ground conductor and the frequency selective surface comprises adjusting a relative permittivity of a variable-dielectric material disposed between the ground conductor and the frequency selective surface.

23. An antenna system comprising:

a transducer comprising one or more antenna elements; and a gain enhancement structure comprising a frequency selective surface and a ground conductor;

wherein the transducer is disposed between the ground conductor and the frequency selective surface; and wherein the frequency selective surface comprises a plurality of unit cells each comprising:

an inner electrically-conductive member having a first meandering perimeter; and an outer electrically-conductive member being an annular conductor and having a second meandering perimeter and having an inner boundary;

wherein the inner electrically-conductive member is disposed inside the inner boundary of the outer electrically-conductive member.

24. The antenna system of claim 23, wherein each of the inner electrically-conductive member and the outer electrically-conductive member has angular symmetry.

25. The antenna system of claim 23, wherein the inner boundary is defined by substantially straight edges.

26. The antenna system of claim 25, wherein the inner electrically-conductive member has a solid interior region.

27. The antenna system of claim 23, wherein the first meandering perimeter defines a plurality of first slots each extending inwardly from a respective outer edge of the inner electrically-conductive member, and the second meandering perimeter defines a plurality of second slots each extending inwardly from a respective outer edge of the outer electrically-conductive member.

28. The antenna system of claim 27, wherein the frequency selective surface is configured to provide a first pass band, a second pass band, and a stop band, the first pass band corresponding to a first frequency band, the second pass band corresponding to a second frequency band, and the stop band corresponding to a third frequency band that is between the first frequency band and the second frequency band, and wherein the frequency selective surface is configured to have a reflection coefficient that is above −3 dB over the first pass band and the second pass band and that is below −3 dB over the stop band.

29. The antenna system of claim 28, wherein the plurality of first slots have respective first widths less than 0.01 wavelengths of a first frequency in the first frequency band and the plurality of second slots have respective second widths less than 0.01 wavelengths of a second frequency in the second frequency band.

* * * * *